(12) United States Patent
Christensen et al.

(10) Patent No.: US 9,304,516 B2
(45) Date of Patent: Apr. 5, 2016

(54) FLIGHT CONTROL LAWS FOR VERTICAL FLIGHT PATH

(75) Inventors: Kevin Thomas Christensen, Plano, TX (US); Shyhpyng Jack Shue, Grapevine, TX (US); Troy Sheldon Caudill, Burleson, TX (US)

(73) Assignee: Textron Innovations Inc., Providence, RI (US)

( * ) Notice: Subject to any disclaimer, the term of this patent is extended or adjusted under 35 U.S.C. 154(b) by 204 days.

(21) Appl. No.: 13/696,963

(22) PCT Filed: Jan. 14, 2011

(86) PCT No.: PCT/US2011/021225
§ 371 (c)(1),
(2), (4) Date: Nov. 8, 2012

(87) PCT Pub. No.: WO2012/096668
PCT Pub. Date: Jul. 19, 2012

(65) Prior Publication Data
US 2013/0060406 A1 Mar. 7, 2013

(51) Int. Cl.
*B64C 19/00* (2006.01)
*G05D 1/08* (2006.01)
*G05D 1/10* (2006.01)

(52) U.S. Cl.
CPC .............. *G05D 1/0858* (2013.01); *G05D 1/102* (2013.01)

(58) Field of Classification Search
CPC ... G05D 1/0858; G05D 1/102; G05D 1/0669; G05D 1/101; G05D 1/062; G05D 1/0825; B64C 13/04; B64C 29/0033; B64C 27/20; B64C 27/24; B64C 27/04; B64C 27/56; B64C 27/72; B64C 27/82; B64C 27/26; B64C 27/52; B64C 39/024; B64C 39/12; B64C 3/385; B60W 40/11; B60W 40/112; B60W 40/114
USPC ............... 701/3, 4, 5, 11, 14, 16, 24, 42, 532; 244/17.13, 17.19, 220, 234, 17.11, 244/175, 178, 180
See application file for complete search history.

(56) References Cited

U.S. PATENT DOCUMENTS

| 3,528,633 A | 9/1970 | Knemeyer |
| 3,800,127 A | 3/1974 | Knemeyer et al. |

(Continued)

FOREIGN PATENT DOCUMENTS

| EP | 2107002 A2 | 11/2009 |
| JP | 2227399 A | 9/1990 |

(Continued)

OTHER PUBLICATIONS

EP Office Action dated Jan. 14, 2014 from counterpart EP App. No. 11855420.3.

(Continued)

*Primary Examiner* — Truc M Do
(74) *Attorney, Agent, or Firm* — James E. Walton

(57) ABSTRACT

A flight control system and method for controlling the vertical flight path of an aircraft, the flight control system includes a stable decoupled model having a decoupled lateral equation of motion and a decoupled longitudinal equation of motion and a feedback command loop operably associated with the stable decoupled model. The feedback command loop includes a vertical flight path angle control law; an altitude control law; and a vertical speed control law.

17 Claims, 12 Drawing Sheets

(56) References Cited

U.S. PATENT DOCUMENTS

| | | | |
|---|---|---|---|
| 3,934,250 A | 1/1976 | Martin | |
| 3,989,208 A | 11/1976 | Lambregts | |
| 4,004,756 A | 1/1977 | Gerstine et al. | |
| 4,005,835 A | 2/1977 | Gerstine et al. | |
| 4,029,271 A | 6/1977 | Murphy et al. | |
| 4,030,011 A | 6/1977 | Hendrick et al. | |
| 4,213,584 A | 7/1980 | Tefft et al. | |
| 4,314,341 A | 2/1982 | Kivela | |
| 4,527,242 A | 7/1985 | McElreath et al. | |
| 4,551,804 A | 11/1985 | Clark et al. | |
| 4,603,389 A | 7/1986 | Griffith et al. | |
| 4,645,141 A | 2/1987 | McElreath | |
| 4,801,110 A | 1/1989 | Skutecki | |
| 4,933,882 A | 6/1990 | Molnar et al. | |
| 5,001,646 A | 3/1991 | Caldwell et al. | |
| 5,050,086 A | 9/1991 | Lambregts | |
| 5,058,836 A | 10/1991 | Nobel | |
| 5,060,889 A | 10/1991 | Nadkarni et al. | |
| 5,062,583 A | 11/1991 | Lipps et al. | |
| 5,076,517 A | 12/1991 | Ferranti et al. | |
| 5,079,711 A | 1/1992 | Lambregts et al. | |
| 5,117,362 A | 5/1992 | Peckham et al. | |
| 5,195,039 A | 3/1993 | Gold et al. | |
| 5,195,700 A | 3/1993 | Fogler et al. | |
| 5,197,697 A | 3/1993 | Lyloc et al. | |
| 5,213,282 A | 5/1993 | Gold et al. | |
| 5,213,283 A | 5/1993 | Gold et al. | |
| 5,222,691 A | 6/1993 | Gold et al. | |
| 5,238,203 A | 8/1993 | Skonieczny et al. | |
| 5,299,759 A | 4/1994 | Sherman et al. | |
| 5,301,112 A | 4/1994 | Gold et al. | |
| 5,428,543 A * | 6/1995 | Gold et al. | 701/5 |
| 5,553,812 A | 9/1996 | Gold et al. | |
| 5,553,817 A | 9/1996 | Gold et al. | |
| 5,596,499 A | 1/1997 | Glusman et al. | |
| 5,716,032 A | 2/1998 | McIngvale | |
| 5,785,281 A | 7/1998 | Peter et al. | |
| 5,799,901 A | 9/1998 | Osder | |
| 5,850,615 A | 12/1998 | Osder | |
| 5,853,152 A * | 12/1998 | Evans et al. | 244/221 |
| 5,868,359 A | 2/1999 | Cartmell et al. | |
| 6,070,829 A | 6/2000 | Bellera et al. | |
| 6,076,024 A | 6/2000 | Thornberg et al. | |
| 6,128,554 A | 10/2000 | Damotte | |
| 6,195,599 B1 | 2/2001 | Laffisse | |
| 6,246,929 B1 | 6/2001 | Kaloust | |
| 6,255,965 B1 | 7/2001 | D'Orso | |
| 6,334,592 B1 | 1/2002 | Tomio et al. | |
| 6,338,454 B1 | 1/2002 | Rollet et al. | |
| 6,367,741 B2 | 4/2002 | Mezan | |
| 6,507,776 B1 | 1/2003 | Fox | |
| 6,622,065 B2 | 9/2003 | Mezan | |
| 6,648,268 B2 | 11/2003 | DuPont | |
| 6,679,458 B2 | 1/2004 | Einthoven et al. | |
| 6,735,500 B2 | 5/2004 | Nicholas et al. | |
| 6,793,173 B2 | 9/2004 | Salesse-Lavergne | |
| 6,868,315 B2 | 3/2005 | Hellio et al. | |
| 7,019,682 B1 | 3/2006 | Louberg et al. | |
| 7,098,811 B2 | 8/2006 | Augustin et al. | |
| 7,106,217 B2 | 9/2006 | Judge et al. | |
| 7,126,496 B2 | 10/2006 | Greene | |
| 7,195,200 B2 | 3/2007 | Yamane | |
| 7,248,208 B2 | 7/2007 | Hager et al. | |
| 7,330,785 B2 | 2/2008 | Odenthal et al. | |
| 7,363,094 B2 | 4/2008 | Kumar | |
| 7,365,652 B2 | 4/2008 | Scherbarth | |
| 7,433,765 B2 | 10/2008 | Fanciullo et al. | |
| 7,437,223 B2 | 10/2008 | Randazzo et al. | |
| 7,440,825 B2 | 10/2008 | Einthoven et al. | |
| 7,463,956 B2 | 12/2008 | Einthoven et al. | |
| 7,499,773 B2 | 3/2009 | Pire et al. | |
| 7,539,561 B2 | 5/2009 | Nonami et al. | |
| 7,555,371 B2 | 6/2009 | Lebrun et al. | |
| 7,558,653 B2 | 7/2009 | Salesse-Lavergne | |
| 7,571,879 B2 | 8/2009 | Builta et al. | |
| 7,617,024 B2 | 11/2009 | Builta | |
| 7,630,798 B2 | 12/2009 | Mossman et al. | |
| 7,642,929 B1 | 1/2010 | Pinkus et al. | |
| 7,693,617 B2 | 4/2010 | Dockter et al. | |
| 7,742,846 B2 | 6/2010 | Fanciullo et al. | |
| 7,751,976 B2 | 7/2010 | Matuska et al. | |
| 7,769,502 B2 | 8/2010 | Herman | |
| 7,784,741 B2 | 8/2010 | Cerchie et al. | |
| 7,792,615 B2 | 9/2010 | Aimar | |
| 7,806,372 B2 | 10/2010 | Boczar et al. | |
| 7,885,717 B2 | 2/2011 | Khial | |
| 7,930,074 B2 * | 4/2011 | Cherepinsky et al. | 701/12 |
| 8,025,256 B2 * | 9/2011 | Miller et al. | 244/194 |
| 2004/0012504 A1 | 1/2004 | Lee | |
| 2004/0093130 A1 * | 5/2004 | Osder et al. | 701/3 |
| 2006/0220883 A1 | 10/2006 | Matos | |
| 2007/0162161 A1 | 7/2007 | Kumar | |
| 2008/0039988 A1 | 2/2008 | Estabrook et al. | |
| 2008/0046137 A1 | 2/2008 | Shue | |
| 2008/0097658 A1 * | 4/2008 | Shue et al. | 701/8 |
| 2008/0234881 A1 * | 9/2008 | Cherepinsky | G05D 1/0858 701/7 |
| 2008/0249672 A1 | 10/2008 | Cherepinsky | |
| 2009/0045294 A1 | 2/2009 | Richardson et al. | |
| 2009/0055038 A1 | 2/2009 | Garrec et al. | |
| 2009/0069957 A1 | 3/2009 | Nakamura | |
| 2009/0112535 A1 | 4/2009 | Phillips | |
| 2009/0138138 A1 | 5/2009 | Ferren et al. | |
| 2009/0177341 A1 | 7/2009 | Deker et al. | |
| 2009/0228161 A1 | 9/2009 | Botargues et al. | |
| 2009/0234518 A1 | 9/2009 | Irwin et al. | |
| 2009/0266940 A1 * | 10/2009 | Miller et al. | 244/223 |
| 2009/0319104 A1 | 12/2009 | Bailey et al. | |
| 2010/0017008 A1 | 1/2010 | Sahasrabudhe et al. | |
| 2010/0082185 A1 * | 4/2010 | Grattard et al. | 701/3 |
| 2010/0161155 A1 | 6/2010 | Simeray | |
| 2010/0170982 A1 | 7/2010 | Regmi | |
| 2010/0204855 A1 | 8/2010 | Vail | |
| 2010/0292873 A1 | 11/2010 | Duggan et al. | |
| 2010/0318245 A1 | 12/2010 | Nakagawa et al. | |
| 2010/0328138 A1 | 12/2010 | Guigne et al. | |
| 2011/0006164 A1 | 1/2011 | Martensson et al. | |
| 2011/0022250 A1 | 1/2011 | Hamburg | |
| 2011/0315806 A1 * | 12/2011 | Piasecki et al. | 244/2 |
| 2012/0072056 A1 * | 3/2012 | Hasan et al. | 701/3 |

FOREIGN PATENT DOCUMENTS

| | | |
|---|---|---|
| JP | 4129900 A | 4/1992 |
| JP | 5124592 A | 5/1993 |
| JP | 5131993 A | 5/1993 |
| WO | 9955582 A2 | 11/1999 |
| WO | 03027789 A1 | 4/2003 |
| WO | 2009081177 A2 | 7/2009 |
| WO | 2010071505 A1 | 6/2010 |

OTHER PUBLICATIONS

International Search Report and the Written Opinion of the International Searching Authority mailed by ISA/USA, U.S. Patent and Trademark Office on Jun. 6, 2011 for International Patent Application No. PCT/US2010/062343, 8 pages.

Office Action dated Dec. 30, 2014 from counterpart CA App. No. 2,824,932.

Office Action dated Feb. 4, 2015 from counterpart App. No. 201180065075.2.

* cited by examiner

Step 1: Hover
Depress Vertical Controller FTR
VS Command
Back Drive OFF
Step 2: Move Vertical
Controller Up
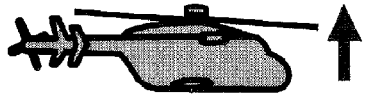
VS Command
Back Drive OFF
Step 3: Release Vertical Controller FTR
VS Command = 0
Back Drive ON
Altitude Hold ON when within
Altitude Hold Thresholds
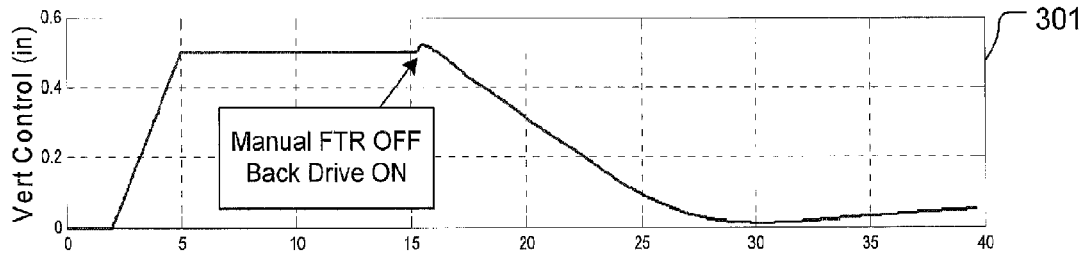
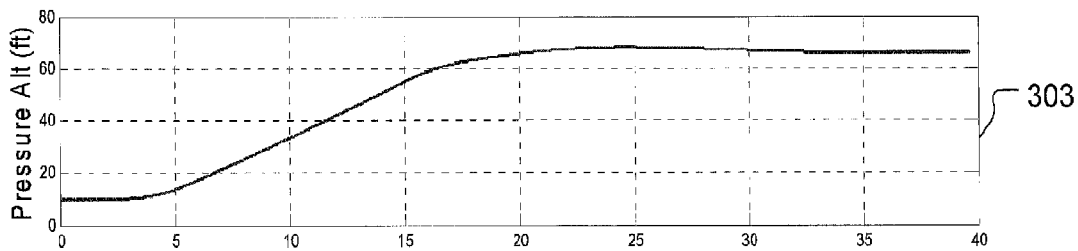
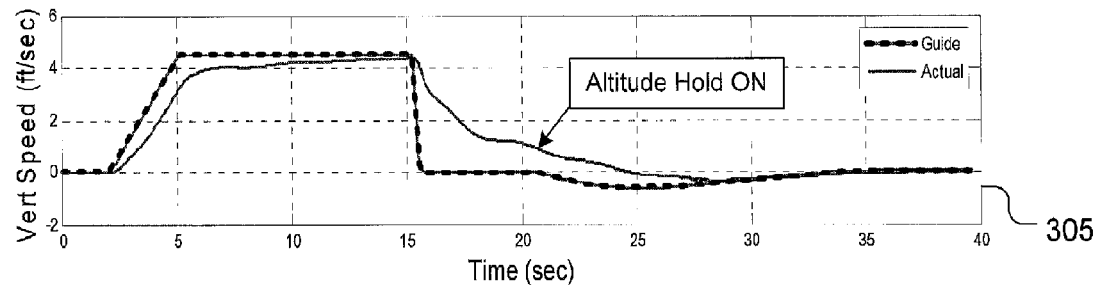
*FIG. 3*

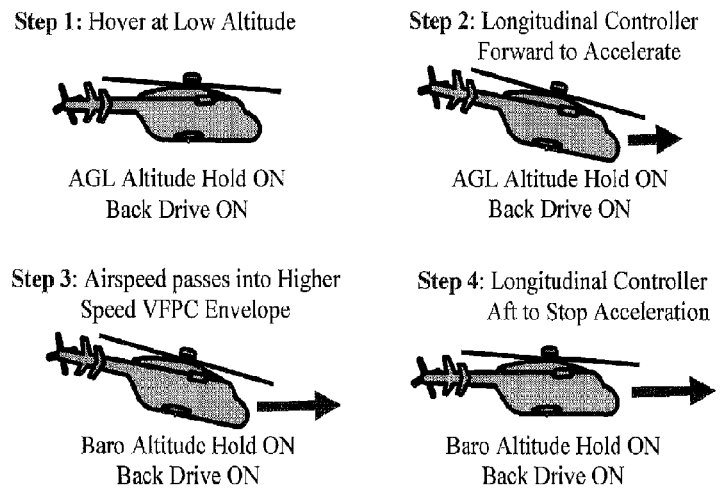
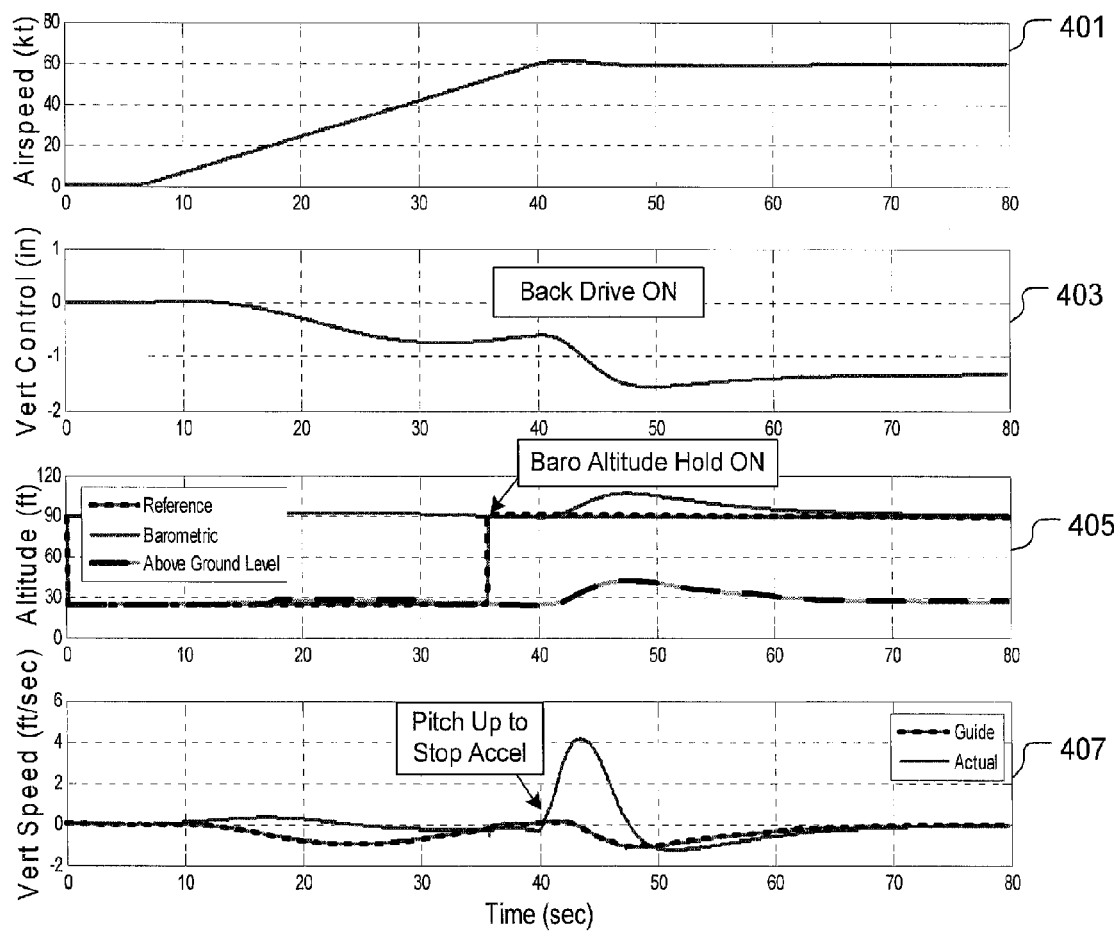
FIG. 4

Step 1: Forward Flight > 50 knots

VFPA Hold ON
Back Drive ON

Step 2: Use Longitudinal Controller to pitch up for deceleration

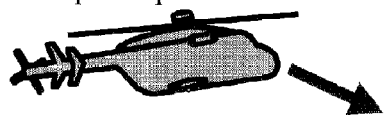

Vertical Controller Back Driven
to hold constant VFPA

Step 3: Use Longitudinal Controller to stop deceleration

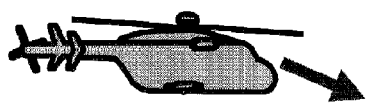

Vertical Controller Back Driven
to hold constant VFPA

Step 4: Move Vertical Controller Up, then Back to Detent

VS Command = 0
Back Drive ON
Altitude Hold ON when within
Altitude Hold Thresholds

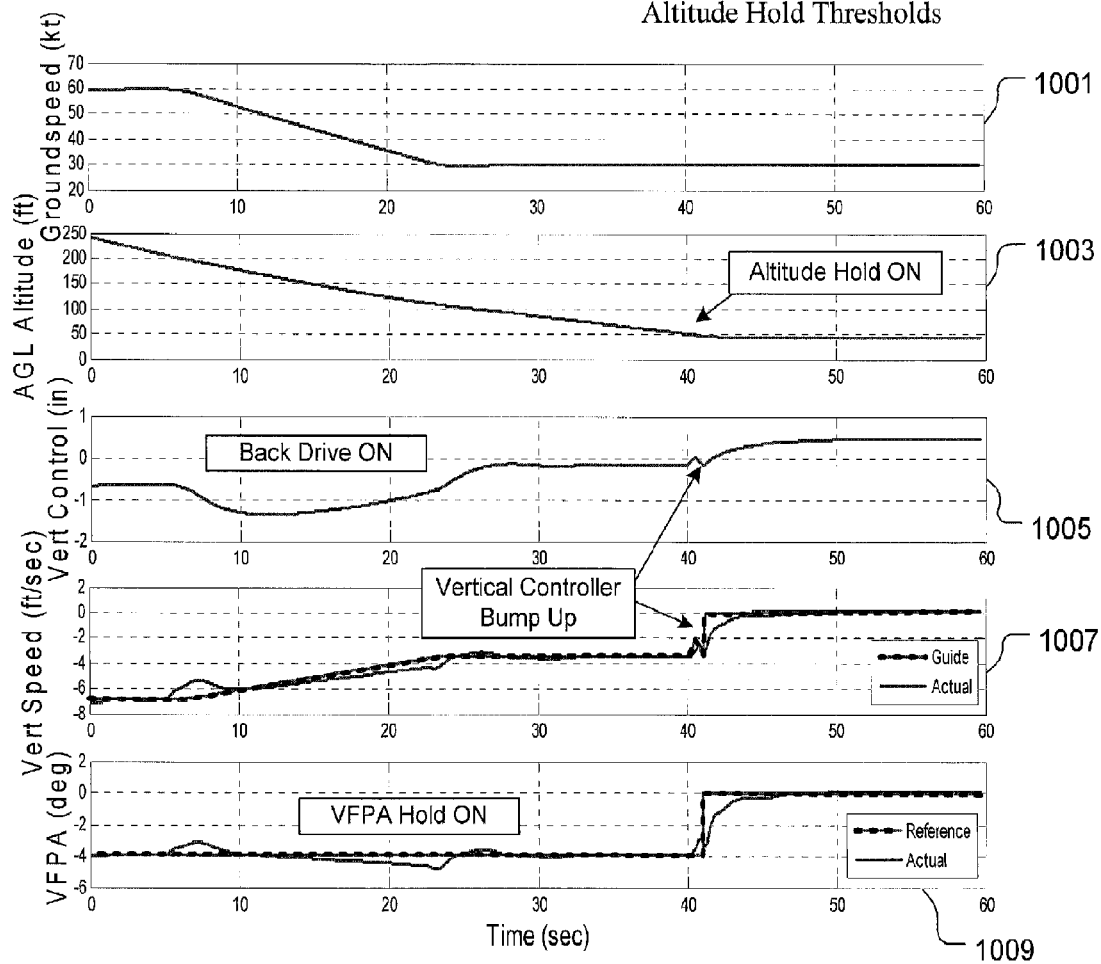

*FIG. 10*

FLIGHT CONTROL LAWS FOR VERTICAL FLIGHT PATH

TECHNICAL FIELD

The present invention relates generally to flight control systems, and more particularly, to flight control laws which enable precise control of a vertical flight path.

DESCRIPTION OF THE PRIOR ART

Aircraft which can hover and fly at low speeds include rotorcraft, such as helicopters and tilt rotors, and jump jets, i.e., the AV-8B Harrier and F-35B Lightning II. In addition to needing to transition into and out of hover, these aircraft can spend significant portions of their mission maneuvering at low speeds relative to the ground. Sometimes, this maneuvering must be conducted in confined spaces around external hazards such as buildings, trees, towers, and power lines.

For traditional flight control systems, ground-referenced maneuvering (GRM) requires the pilot to make constant control inputs in multiple axes in order to counter disturbances caused by wind, as well as to remove the natural coupled response of the aircraft. The pilot workload during such maneuvers can become quite high since the pilot must sense un-commanded aircraft motions and then put in the appropriate control input to eliminate the disturbance. In a worst-case scenario, a pilot might be required to fly GRM in a degraded visual environment. With the lack of visual cues to detect off-axis motion, the pilot might accidentally fly into an external hazard while maneuvering in a confined space.

In order to control the vertical motion of a rotorcraft, conventional rotorcraft mechanical controls adjust the collective pitch angle of the main rotor or rotors. Since changes in rotor collective pitch will also change the power required to maintain rotor speed, an engine governor is utilized to change engine power so that rotor speed will be maintained.

During GRM with traditional rotorcraft collective controls, pilot workload to control vertical flight path can be quite high. In particular, a decelerating approach to hover can be particularly taxing on the pilot since the collective must be continually adjusted to maintain a constant vertical flight path angle (VFPA) toward the hover spot. In degraded visual environments, including inadvertent entry into brown out or white out conditions, misjudging vertical flight path could have catastrophic results.

Feedback control systems have been utilized on rotorcraft in the vertical axis to hold various vertical parameters, such as altitude, vertical speed (VS), or VFPA. A simple application of such a feedback system includes a parallel trim actuator which can drive the mechanical collective controller up or down to hold the desired vertical parameter. In such a control system, the pilot can override the trim actuator by applying force against a trim force gradient to move the collective or by using a force trim release (FTR) switch to un-clutch the trim actuator. Once the pilot releases the collective force or the FTR switch, the feedback loops will capture and hold the new vertical parameter.

Using a parallel trim actuator for vertical control has several drawbacks. First, since an actuator failure might result in a runaway collective controller, the maximum actuation rates must be limited. With this rate limiting, the collective might not be able to move fast enough to maintain the vertical parameter during maneuvering flight. For example, during an aborted takeoff, the initial pitch up to slow down will result in altitude ballooning since the parallel trim actuator cannot move the collective down fast enough to hold altitude. As the aircraft slows down to a hover, the trim actuator cannot move the collective up fast enough to keep it from sinking into the ground.

Another drawback of using a parallel trim actuator for vertical control is the increased pilot workload to change the vertical state. In order to overcome the trim actuator, the pilot must either apply collective control force or activate a FTR switch. This increase in workload could degrade vertical flight path precision during GRM.

The last drawback of the parallel trim actuator is that once the pilot has overridden it with either force or a FTR switch, the feedback control system is disabled and all of the advantages of control augmentation are lost. Without vertical augmentation, control inputs in other axes could couple into the vertical axis, thus degrading the precision of pilot-in-the-loop vertical maneuvering.

An alternate vertical control design replaces all mechanical control linkages from the cockpit controls to rotor collective pitch with electrical wire. In this "fly-by-wire" (FBW) design, the cockpit controls are fed into a flight control computer which calculates the collective control signal needed to attain the vertical response commanded by the pilot. With high redundancy in the control system components, the probability of a control system failure is low enough to enable fast, full authority control of rotor collective pitch, or any other control surfaces used for vertical control of the aircraft.

Since FBW flight controls can automatically adjust the control trim positions, the need for trimming cockpit controls is eliminated. This can greatly simplify the cockpit controls by allowing for implementation of a "unique trim" design. With a unique trim controller, the pilot commands a change in aircraft state with the controller out of the center "detent" position, and commands the aircraft to hold the current trim state with the controller returned to detent. The pilot can also use a cockpit switch to "beep" small changes to the aircraft state without moving the controller out of detent.

One such implementation of unique trim is a four-axis sidearm controller. With this controller, vertical commands are made by moving the controller up and down. Since commands for the other three axes are made with the same controller, the pilot must be careful to make commands only in the desired axis.

The main drawback of using a unique trim controller in the vertical axis is that the pilot has no tactile feedback on actual collective position or aircraft power. The loss of power tactile cues forces the pilot to rely on secondary cues like cockpit gauges to assess and respond to power limits. This distraction could result in a loss of situational awareness during critical phases of a flight, like GRM or while handling emergency procedures such as a loss of power.

Although the foregoing developments represent great strides in the area of flight control laws, many shortcomings remain.

BRIEF DESCRIPTION OF THE DRAWINGS

The novel features believed characteristic of the application are set forth in the appended claims. However, the application itself, as well as a preferred mode of use, and further objectives and advantages thereof, will best be understood with reference to the following detailed description when read in conjunction with the accompanying drawings, wherein:

FIG. 3 shows an example of the sequence of events to change hover altitude by moving the vertical controller with the FTR switch depressed;

FIG. 4 shows an example of the sequence of events to transition from AGL altitude hold to barometric altitude hold by accelerating into the higher speed VFPC envelope;

FIG. 10 shows an example of the sequence of events to transition from VFPA hold to altitude hold while operating in the low speed VFPC envelope;

Figure 1:
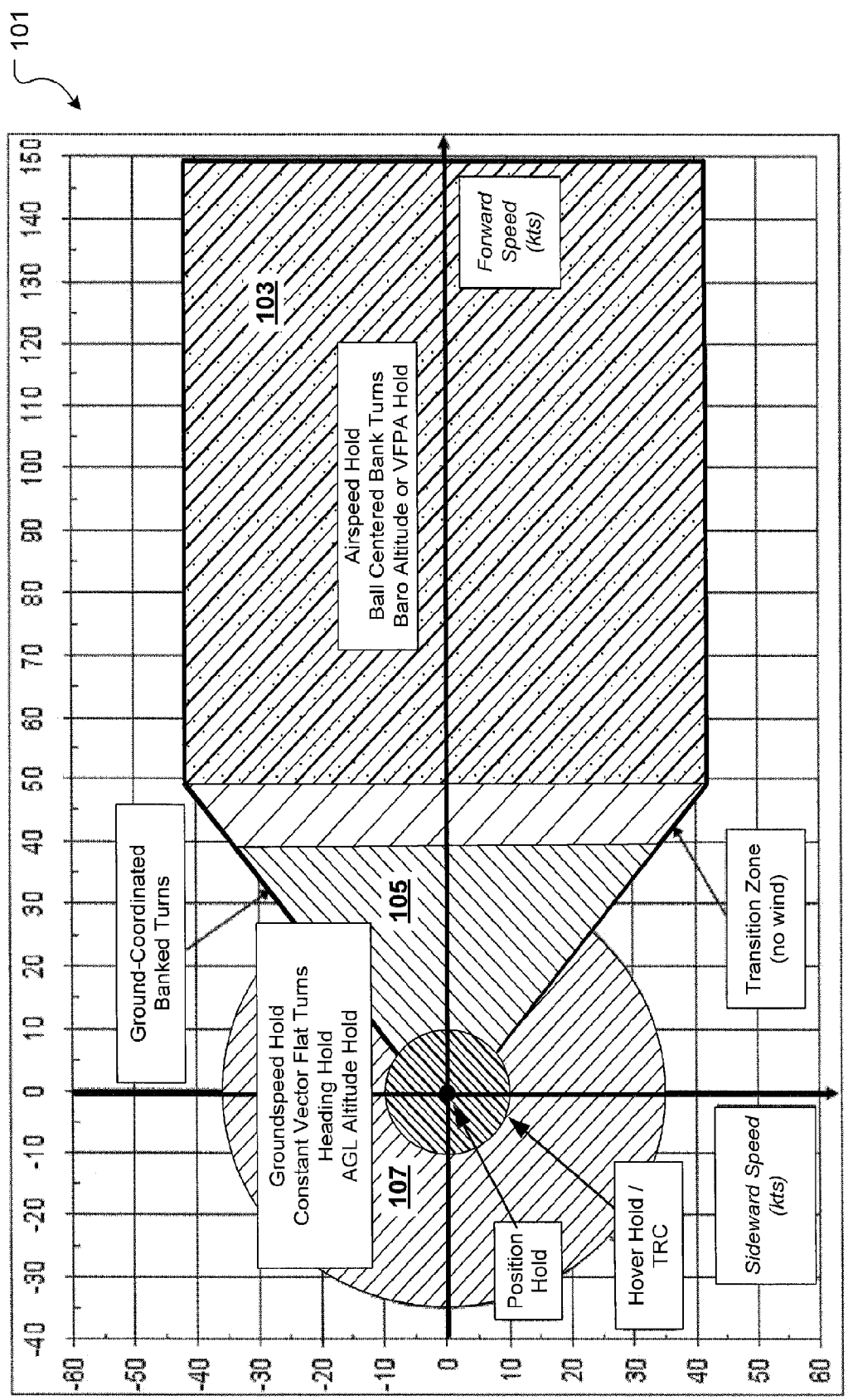
FIG. 1 shows a representative flight envelope with the control law modes designed to enable ground reference maneuvers.

While the system of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DESCRIPTION OF THE PREFERRED EMBODIMENT

The flight control laws enable precise vertical flight path control (VFPC) throughout the flight envelope, while providing tactile feedback to the pilot on aircraft power state. In the absence of vertical control inputs by the pilot, the control laws will hold either altitude or VFPA. Vertical beep inputs enable precise changes to either altitude or VFPA. During vertical hold and beep operations, the cockpit vertical controller will be back driven to approximately match the actual vertical command being sent to the aircraft's vertical controls (main rotor collective pitch for helicopters). Pilot inputs into the vertical controller will command changes in VS.

FIG. 1 shows a representative flight envelope 101 with the control law modes designed to enable GRM. For this invention, region 103 depicts the higher speed VFPC envelope, while region 105 and region 107 depict the low speed VFPC envelope. At higher speed, VFPC will hold either barometric altitude or VFPA. With the integration of forward looking terrain sensors capable of providing updates to a terrain database, VFPC could also provide terrain following for low altitude operations at higher speeds. At low speed and low altitude, VFPC will use data from an above ground level (AGL) altitude sensor, such as a radar altimeter, to hold AGL altitude.

In the absence of pilot vertical control inputs, the control laws will automatically engage altitude hold when the absolute value of either VS or VFPA fall below the design thresholds, typically 1 ft/sec and 1°, respectively. When operating in the higher speed VFPC envelope 103 in the absence of pilot vertical control inputs, the control laws will automatically engage VFPA hold when vertical state is higher than the altitude hold thresholds.

The control laws recognize pilot vertical control inputs whenever the pilot manually depresses a FTR switch (not shown) or applies enough control force to move the aircraft controller out of a back driven detent position. In the presence of pilot vertical control inputs, the control laws will no longer back drive the vertical controller and will command a change in VS proportional to the amount of control displacement from the detent position.

Figure 2:
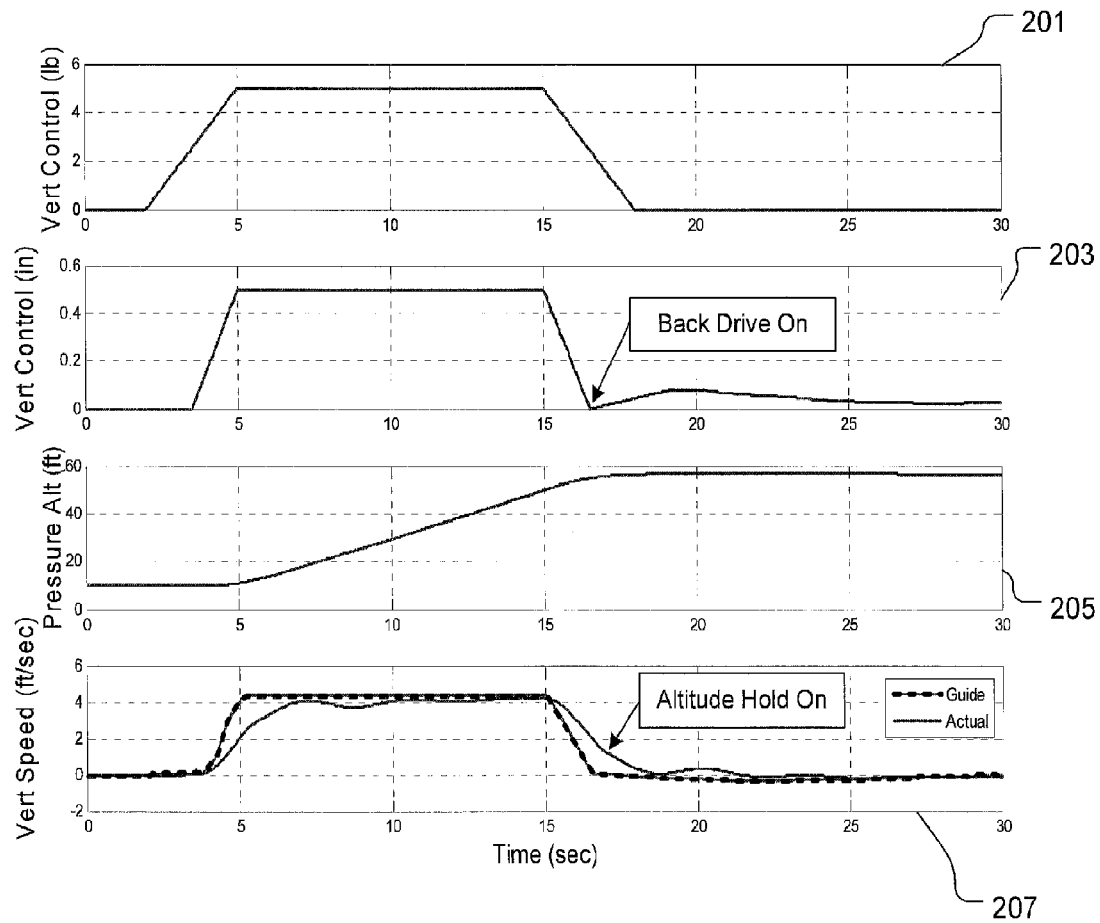
FIG. 2 shows an example of the sequence of events to change hover altitude by applying force to the vertical controller.

FIG. 2 shows an example of the sequence of events to change hover altitude by applying force to the vertical controller. Plots 201, 203, 205, and 207 in FIG. 2 are from simulation data of an up vertical controller input during hover. Plot 201 shows the vertical controller force, while plot 203 shows the vertical controller displacement. Plot 201 shows a breakout force of 2.5 lb before the vertical controller starts moving out of the detent position. Plot 203 shows the VS command in the control laws as a result of the vertical controller displacement. Once the pilot released the vertical controller force, the VS command went back to zero. Altitude hold came back on when the vertical state fell back within the altitude hold threshold. In this case, the absolute value of VS dropped below the threshold of 1 ft/sec. Plot 205 shows the change in altitude, while plot 207 shows the change in vertical speed, both plots 205 and 207 changing as a result from the vertical controller input.

FIG. 3 shows an example of the sequence of events to change hover altitude by moving the vertical controller with the FTR switch depressed. Plots 301, 303, and 305 in FIG. 3 are from simulation data of an up vertical controller input with the FTR switch depressed during hover. Plots 301 and 303 show the vertical controller displacement with FTR depressed, while plot 305 shows the VS command that resulted from movement of the vertical controller with the FTR depressed. Once the FTR was no longer depressed, the VS command went to zero and the vertical controller was back driven to level off the aircraft. Just like the example without the FIR depressed, altitude hold came back on when the vertical state dropped below the altitude hold thresholds.

FIG. 4 shows an example of the sequence of events to transition from AGL altitude hold to barometric altitude hold by accelerating into the higher speed VFPC envelope. Plots 401, 403, 405, and 407 in FIG. 4 are from simulation data of an acceleration from hover to 60 knots indicated airspeed (KIAS) at low altitude. Plot 401 shows airspeed during the acceleration. Plot 403 shows the back drive of the vertical controller during the acceleration. Plot 405 shows the jump in reference altitude in red when the aircraft accelerated into the higher speed VFPC envelope. Plot 407 shows the lack of transient in VS guide during the switch to barometric altitude hold. The increase in VS in this plot was due to the pitch up to stop the deceleration. Plot 405 shows that even with this slight balloon, barometric altitude still came back to the reference altitude.

In the higher speed VFPC envelope, the control laws will automatically engage FTR when the pilot applies enough force to move the vertical controller out of the detent position. Thus, a slight amount of force (typically 2-3 lb) will release force trim and allow the pilot to move the vertical controller to set the desired VS without having to use the manual FTR switch. The automatic FTR feature (Auto FlR) will turn off once the vertical controller stops moving for a set amount of time (typically 3-4 seconds). At this point, the control laws will automatically engage VFPA hold as long as the vertical state is above the altitude hold thresholds.

Figure 5:
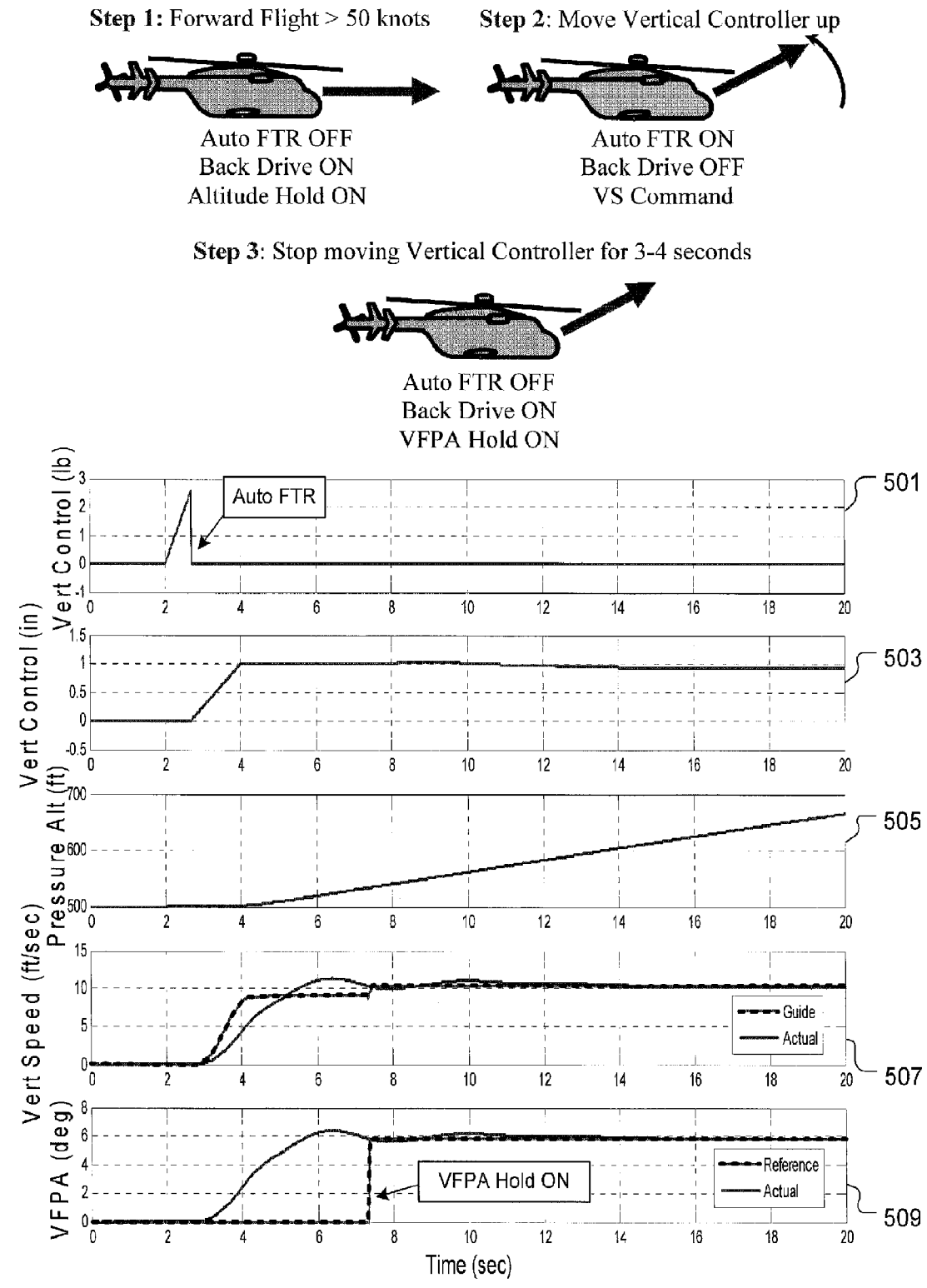
FIG. 5 shows an example of the sequence of events to transition from altitude hold to a climbing VFPA hold.

FIGS. 5-8 apply to the high speed VFPC envelope. FIG. 5 shows an example of the sequence of events to transition from altitude hold to a climbing VFPA hold. Plots 501, 503, 505, 507, and 509 in FIG. 5 are from simulation data of an up vertical controller input during level flight at 60 KIAS. Plot 501 shows that controller force dropped to zero when Auto FTR came on. Note that on the actual aircraft, the pilot would still have to apply a very small amount of force to overcome friction when moving the vertical controller with FTR engaged. Plot 509 shows that VFPA hold came on about 3-4 seconds after the pilot stopped moving the collective. This coincided with the time that Auto FTR turned off. Close inspection of plot 503 shows that the vertical controller had a slight amount of movement after VFPA hold came on, signifying that the back drive was active.

Auto FTR will also turn off when the vertical state is back within the altitude hold thresholds. This enables the pilot to return the aircraft to altitude hold without having to look inside the cockpit to ensure VS is back at zero. For example, to level off from a climb, the pilot will initially need to push a slight amount of down force to disengage VFPA hold. As the pilot continues to move the collective down to level off, he or she will feel the control force increase to signify that the vertical state is within the altitude hold thresholds. If the pilot stops moving the vertical controller at this point, the aircraft will enter altitude hold. On the other hand, if the pilot applies enough force to overcome the altitude hold detent, Auto FTR will release the force, and continued collective movement will set a descent rate.

Figure 6:
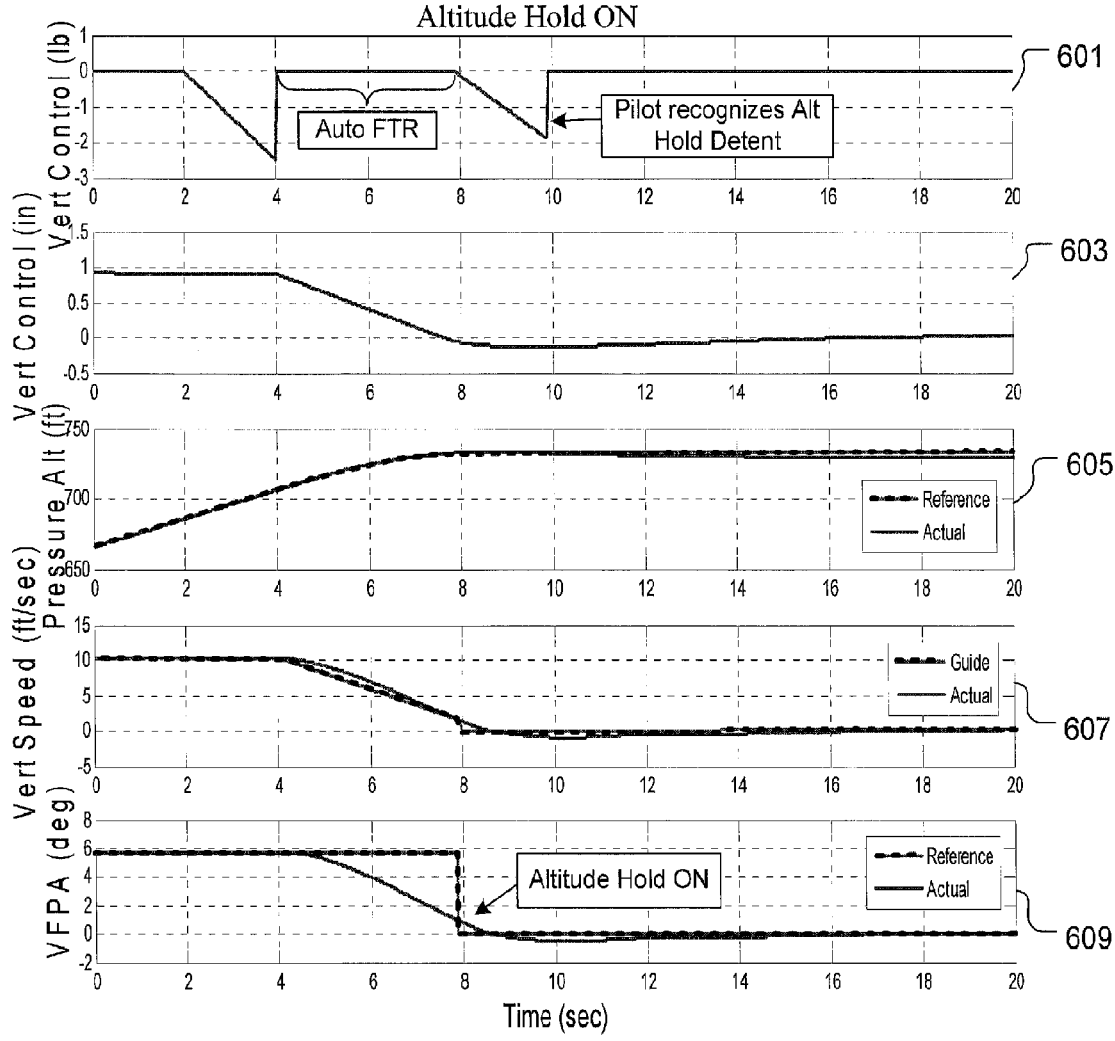
FIG. 6 shows an example of the sequence of events to transition from a climbing VFPA hold to altitude hold.

FIG. 6 shows an example of the sequence of events to transition from a climbing VFPA hold to altitude hold. Plots 601, 603, 605, 607, and 609 in FIG. 6 are from simulation data of a down vertical controller input during a climb at 60 KIAS. Plot 601 shows that controller force dropped to zero when Auto FTR came on. Plot 607 shows the VS command. Plot 609 shows that altitude hold came on when the vertical state dropped below the altitude hold thresholds. In this case, the absolute value of VFPA dropped below the threshold of 1°. Plot 601 shows that when altitude hold turned on, Auto FTR turned off. The build up in control force at this point was a cue to the pilot that the controller was in the altitude hold detent. Close inspection of plot 603 shows that the vertical controller had a slight amount of movement after altitude hold came on, signifying that the back drive was active.

Figure 7:
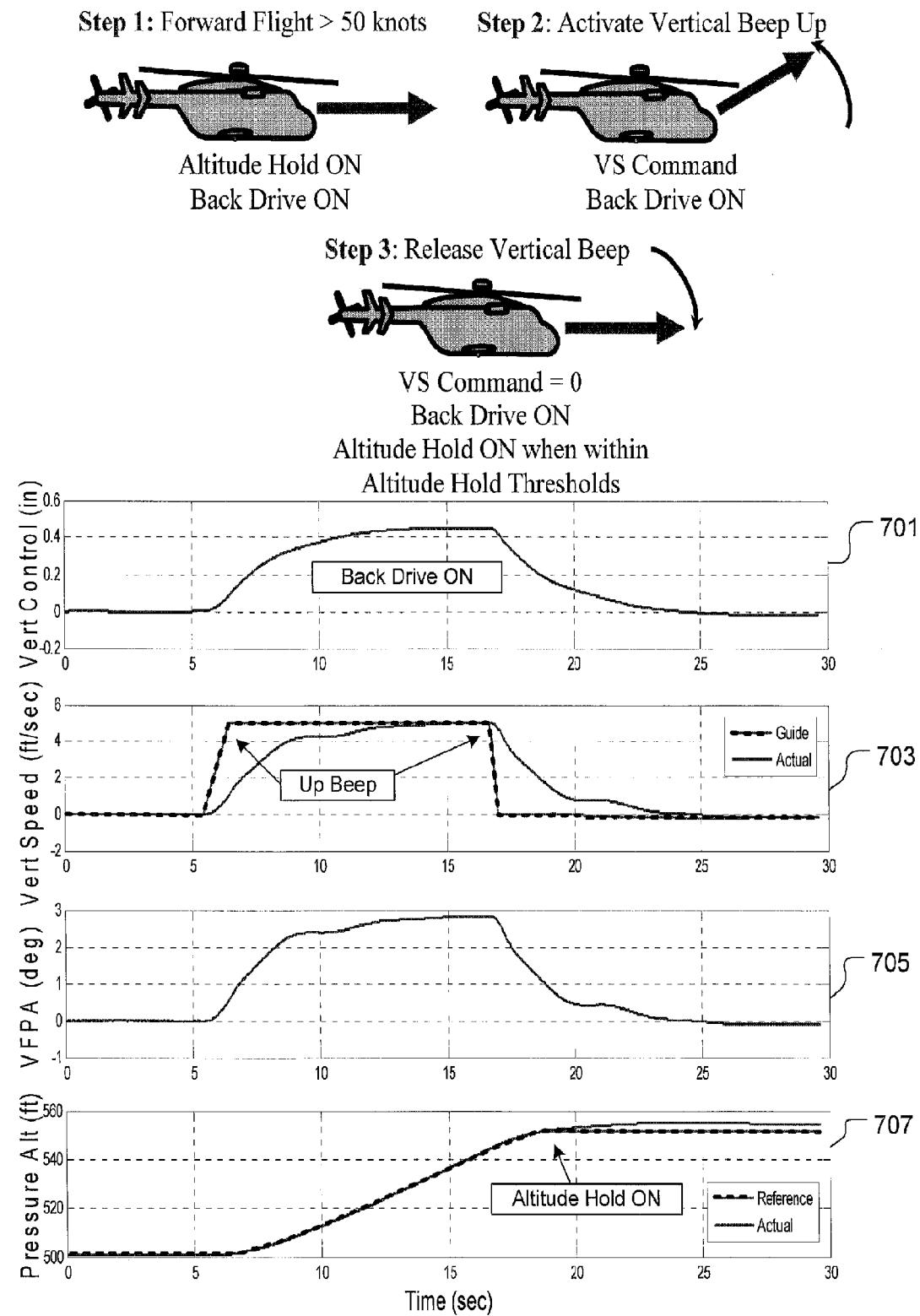
FIG. 7 shows an example of the sequence of events to beep altitude.

When established in altitude hold, the pilot can use the vertical beep switch to make precision adjustments to altitude. FIG. 7 shows an example of the sequence of events to beep altitude. Plots 701, 703, 705, and 707 in FIG. 7 are from simulation data of an up vertical beep while level at 60 KIAS. Plot 701 shows that the cockpit vertical controller was back driven up by around 0.5 inch during the beep and then came back near its original position once the beep was released. Plot 703 shows the VS command that resulted from the vertical beep switch input. In this case, the altitude beep commanded a VS of 5 ft/sec. This VS beep rate is scheduled in the control laws so that in a low altitude hover the pilot can use vertical beep to command a 2 ft/sec landing. Plots 705 and 707 show that altitude hold came back on once the beep switch was released and the vertical state dropped below the altitude hold thresholds. In this case, the absolute value of VFPA dropped below the threshold of 1°.

Figure 8:
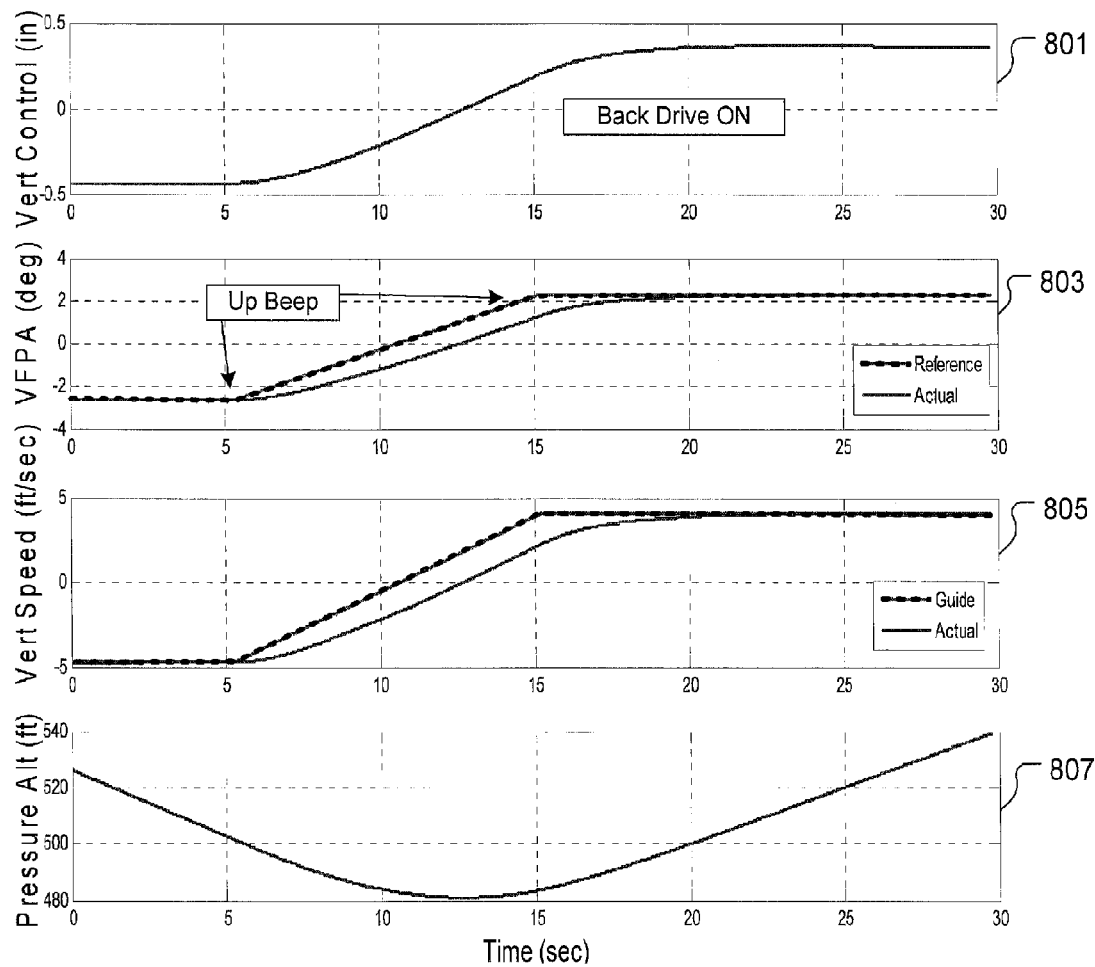
FIG. 8 shows an example of the sequence of events to beep VFPA.

When established in VFPA hold, the pilot can use the vertical beep switch to make precision adjustments to VFPA. FIG. 8 shows an example of the sequence of events to beep VFPA. Plots 801, 803, 805, and 807 in FIG. 8 are from simulation data of an up vertical beep while in a descent at 60 KIAS. Plot 801 shows that the cockpit vertical controller was back driven up by around 0.8 inch during the beep. Plot 803 shows how the up beep resulted in the reference VFPA moving up at a set rate. In this case, the VFPA beep rate was set at 0.5 deg/sec. The reference VFPA from plot 803 was converted into a VS guide on plot 805. Plot 803 and plot 805 also highlight the logic to prevent altitude hold from automatically coming on during a VFPA beep. As long as the vertical beep is held while transitioning through the altitude hold thresholds, the beep will continue to command a change in VFPA. However, if the beep was released while within the altitude hold thresholds, then the control laws would automatically transition into altitude hold.

Figure 9:
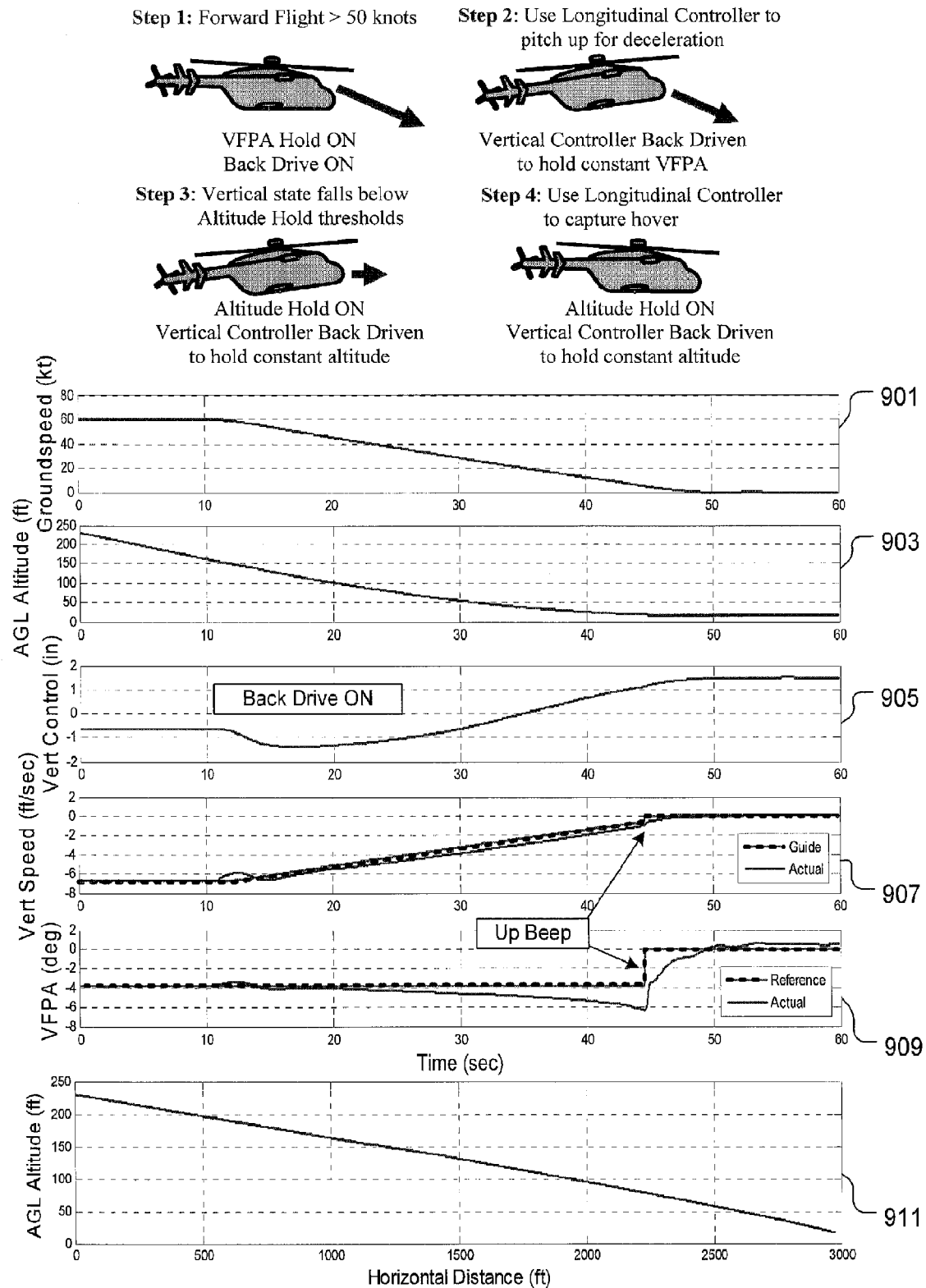
FIG. 9 shows an example of the sequence of events to decelerate at a constant VFPA in a descending approach to a hover.

If the pilot changes forward speed while in VFPA hold, the control laws will automatically adjust the vertical control command and back drive the vertical controller to hold VFPA. FIG. 9 shows an example of the sequence of events to decelerate at a constant VFPA in a descending approach to a hover. Plots 901, 903, 905, 907, 909, and 911 in FIG. 9 are from simulation data of a decelerating approach to hover. Plots 901 and 903 show the decrease in airspeed and altitude, respectively, during the approach to hover. Plot 905 shows that the cockpit vertical controller was back driven down during the initial pitch up to start the deceleration. As the deceleration continued, the vertical controller was back driven up to hold a constant VFPA. Plots 907 and 909 show the smooth transition to altitude hold when the vertical state dropped below the altitude hold thresholds. In this case, the absolute value of VS dropped below the threshold of 1 ft/sec. Plot 911 shows that the aircraft maintained a constant vertical flight path toward the hover point during the entire deceleration.

Once the pilot transitions into the low speed VFPC envelope while in VFPA hold, the Auto FTR feature will be disabled and VFPA can be changed by using the vertical beep as shown in FIG. 8. The pilot can also make vertical controller inputs, either with or without the FTR switch depressed, to command changes to VS. However, once the vertical controller is back in detent without the manual FTR switch depressed, the control laws will command a VS of zero, automatically returning the aircraft to altitude hold once the vertical state is below the altitude hold threshold.

FIG. 10 shows an example of the sequence of events to transition from VFPA hold to altitude hold while operating in the low speed VFPC envelope. Plots 1001, 1003, 1005, 1007, and 1009 in FIG. 10 are from simulation data of a constant VFPA deceleration to 30 knots groundspeed (KGS) followed by a small vertical control input for level off. Plot 1001 shows the deceleration to 30 KGS. Plot 1005 shows the back driven vertical controller position to hold constant VFPA during the deceleration. At 40 seconds, the pilot made a slight up input, or bump, into the vertical controller. When the controller went back into detent, the VS command went to zero as shown on the fourth plot. This bump input caused the aircraft to level off and enter altitude hold. The same series of events would have happened if the pilot had momentarily depressed the vertical FTR switch while in VFPA hold in the low speed VFPC envelope.

Figure 11:
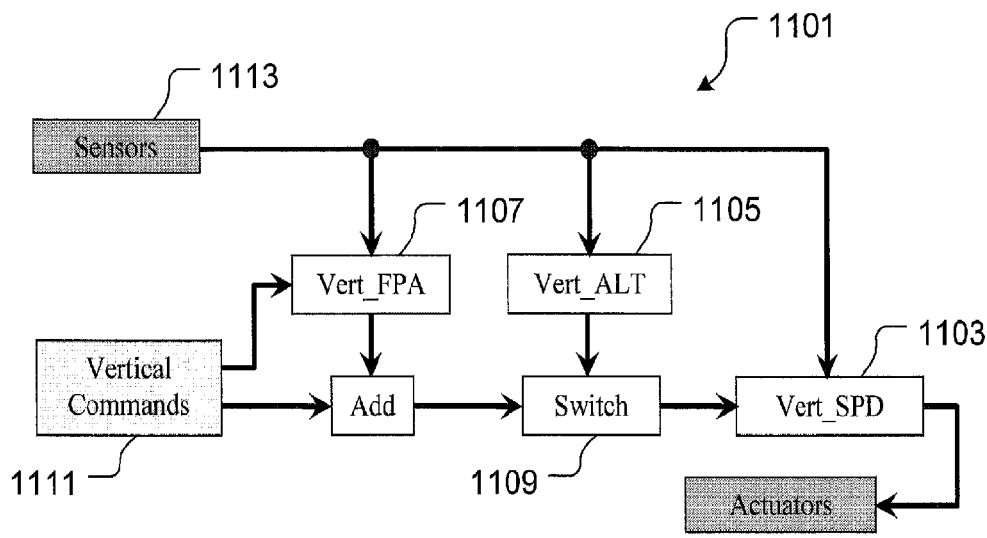
FIG. 11 shows the vertical commands generated in the control laws by referencing the pilot's cockpit vertical controller, vertical beep switch, and vertical controller FTR switch.

Those skilled in the art will understand that the methods for vertical aircraft guidance disclosed in this invention can be applied to any combinations of: full authority FBW flight control systems, as well as partial authority mechanical systems; and, any aircraft capable of GRM, including both rotorcraft and jump jets The key to enabling the VFPC capability lies in an advanced control law architecture 1101 as shown in FIG. 11. FIG. 11 illustrates VFPC architecture 1101 comprising three vertical controls: a first block 1103 for controlling VS labeled as "Vert_SPD", a second block 1105 for controlling the altitude labeled as "Vert_ALT", and a third block 1107 for controlling VFPA labeled as "Vert_FPA".

Since VS is the primary vertical state controlled by vertical control actuators, block 1103 is the inner loop of the vertical control laws. Block 1103 is fed by either block 1105 if altitude hold is on or the summation of the VS command and the output from block 1107 if altitude hold is off.

Block 1105 contains logic to switch between barometric altitude hold and AGL altitude depending on whether the aircraft is in the high or low speed VFPC envelope. This logic will also reset the reference altitude during the switch to prevent a jump in the output from block 1105.

Vertical commands 1111 are generated in the control laws by referencing a pilot's cockpit vertical controller, a vertical beep switch, and a vertical controller FTR switch. The control laws process these control inputs to generate the appropriate vertical response commands. These commands are then sent out to the control law guidance blocks to maneuver the aircraft in the vertical axis.

Some of the following aircraft sensors 1113 are needed by the control laws to accomplish VFPC, including: Inertial Navigation System (groundspeed and VS); Air Data Computer (airspeed and barometric altitude); and, Radar or Laser Altimeter (AGL altitude). An aircraft model can be obtained from aerodynamics data and a group of linear models can be developed based on its airspeed form aircraft sensors 1113. These linear models include both lateral and longitudinal equations of motion. Since the aircraft model matrices are large and contain coupling terms of lateral and longitudinal motions within the matrices, it is difficult to determine the best performance control gains for all at the same time. In order to overcome these issues, the linear model of aircraft performance is decoupled first. After the aircraft model is decoupled to lateral and longitudinal equations of motion, the effect of coupling terms between lateral and longitudinal motions can be reduced to minimum, thus stabilizing the system.

These control laws can be applied to any rotorcraft or jump jet. The VFPC output just needs to be routed to the appropriate actuator or actuators. For a conventional helicopter, the VFPC output is sent to main rotor collective pitch. The control laws use vertical controller force to determine if the controller is out of the no force detent position. The threshold for out of detent is typically set to match the vertical controller breakout force (typically 2-3 lbs), with hysteresis to prevent rapid cycling of the detent flag. The control laws calculate the vertical controller displacement whenever the controller is either out of detent or FTR is enabled. The vertical controller displacement is subsequently used to compute the VS command.

Vertical commands are also generated by the vertical beep switch. If in altitude hold, the beep switch will generate a VS command as shown in FIG. 7. Likewise, if in VFPA hold, the beep switch will generate a VFPA change rate as shown in FIG. 8.

Figure 12:
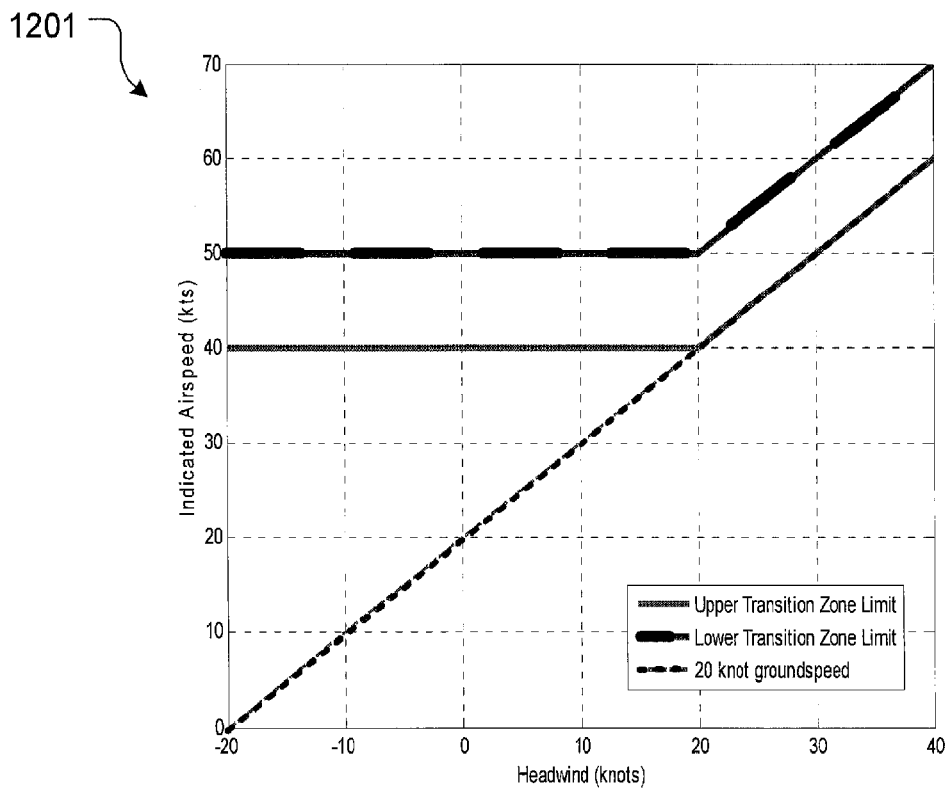
FIG. 12 shows how the transition zone is moved upward as headwind increases so that the lower limit will never drop below 20 KGS.

The speed transition zone between the high and low speed VFPC envelopes is based on indicated airspeed so that the pilot will have awareness of the control law region. The transition zone is 10 knots wide, with the lower limit at 40 KIAS when headwind is below 20 knots. FIG. 12 shows how transition zones 1201 are moved upward as headwind increases so that the lower limit will never drop below 20 KGS. This algorithm ensures that the control laws will always be in the low speed VFPC envelope when below 20 KGS, even when flying into a strong headwind.

When accelerating forward, the control laws will switch to the high speed VFPC envelope when passing the upper limit of the transition zone. When slowing down, the switch to the low speed envelope will occur when passing the lower limit of the transition zone. This speed hysteresis prevents rapid switching between the low and high speed control laws when operating in the transition zone.

The VFPA used in block 1107 is computed in the control laws using the following equation:

$$\gamma = \tan^{-1}\left(\frac{V_z}{V_x}\right) \quad (1)$$

where $\gamma$ is the VFPA, $V_z$ is the VS with up positive, and $V_x$ is the forward groundspeed. To avoid a singularity in Equation 1, $V_x$ is limited to be above 5 KGS.

When VFPA hold turns on, block 1107 will initialize to the current VFPA. Block 1107 uses the following equation to compute the VS needed to hold the reference VFPA:

$$V_{z\,REF} = V_x \cdot \tan \gamma_{REF} \quad (2)$$

Where $V_{z\,REF}$ is the reference VS and $\gamma_{REF}$ is the reference VFPA. Any changes to forward groundspeed will result in a change in the output from block 1107.

While VFPA hold is on, the VFPA beep command will change the reference VFPA at a set rate. When the pilot makes an input into the vertical controller to change VS, the VFPA beep will no longer be active. Additionally, block 1107 will continue to output the VS required to hold the reference VFPA. This value will be summed with the pilot's commanded change in VS to provide VS guidance to block 1103. When the vertical controller is back in detent, if the aircraft's vertical state is within the altitude hold thresholds, or if the aircraft is in the low speed VFPC envelope, block 1107 will reset to a VFPA of zero.

In order to minimize the effect of aggressive pitch changes on VS, block 1103 includes a loop to predict the change in VS caused by a pitch attitude change. The predicted VS change is computed using the following equation:

$$V_{z\Delta\theta} V_x \cdot \tan \Delta\theta \quad (3)$$

Where $V_{z\Delta\theta}$ is the pitch induced VS change and $\Delta\theta$ is the change in pitch attitude. The pitch change is calculated using a washout filter with a time constant typically less than one second. This pitch induced VS is subtracted from the VS guide input into block 1103 from switch 1109 in FIG. 11. As a result, the VFPC command output from block 1103 block will lead any pitch changes to minimize their effect on VS.

Figure 13:
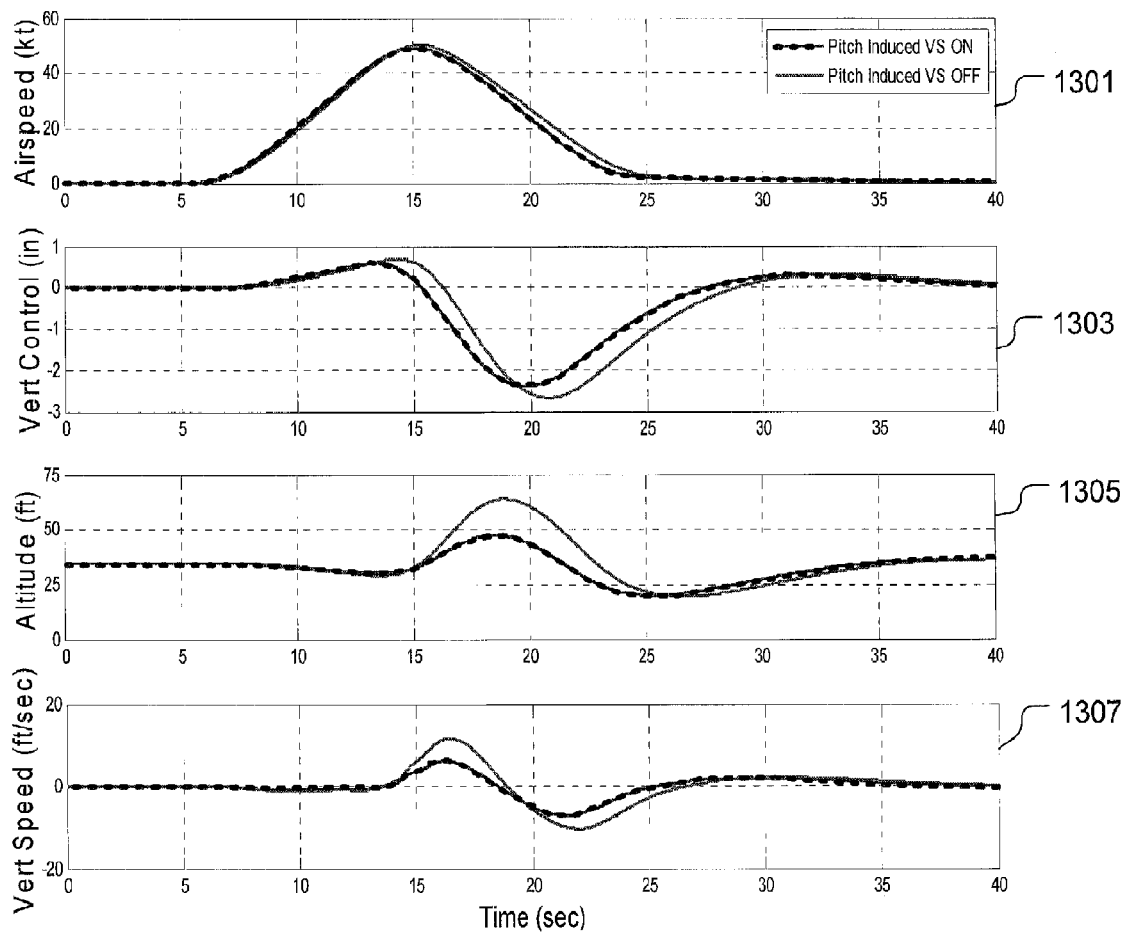
FIG. 13 shows simulation data of an aggressive acceleration from hover to 50 KIAS, followed by an aggressive deceleration back to hover.

The pitch induced VS loop will significantly improve altitude hold performance during a low altitude depart-abort maneuver. Plots 1401, 1403, 1405, and 1407 in FIG. 13 show simulation data of an aggressive acceleration from hover to 50 KIAS, followed by an aggressive deceleration back to hover. FIG. 13 also shows that pitched induced VS improves altitude hold. The maneuver was flown with the pitch induced VS loop on and off. Plot 1403 shows the effect of the pitch induced VS loop on the vertical controller. During the aggressive pitch up to start the deceleration, the vertical controller started to back drive down one to two seconds sooner with the pitch induced VS loop on. Plot 1405 shows that altitude held within 15 feet during this aggressive maneuver with the pitch induced VS loop on. When the loop was turned off, the aircraft ballooned up twice as high during the aggressive pitch up for the deceleration.

Figure 14:
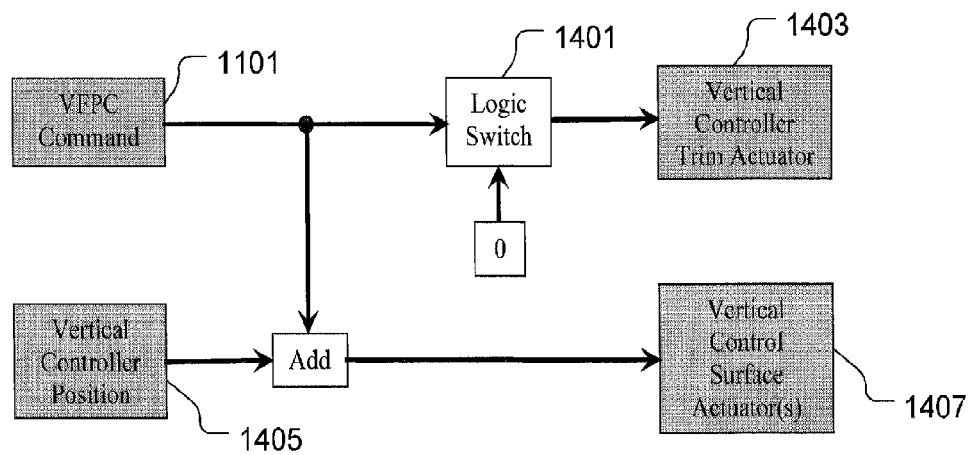
FIG. 14 shows how the vertical control laws route the VFPC command to the appropriate vertical control actuators.

FIG. 14 shows how the vertical control laws route the VFPC command to the appropriate vertical control actuators. When the vertical controller is in detent without FTR, a logic switch 1501 will allow VFPC command 1101 to back drive a vertical controller trim actuator 1503. This VFPC back drive command is a trim rate signal sent to move the trim actuator.

The VFPC command is also added to an actual vertical controller position 1505 as shown in FIG. 14. This signal is then transmitted to a vertical control surface actuator 1507 to affect the aircraft's vertical state. For conventional helicopters, this is the signal that is transmitted to the main rotor collective pitch actuator. This actuator signal can be transmitted either electrically for a FBW flight control system, or mechanically for a conventional flight control system. For the mechanical case, the VFPC command signal is sent to a series actuator, which adds this displacement to the displacement of the pilot's vertical controller.

During vertical controller back drive, when the VFPC command goes to zero, the vertical controller will stop moving. At this point, the cockpit vertical controller will match the relative position of the vertical control surface actuator to give the pilot tactile feedback of the power demands on the aircraft.

When the pilot moves the vertical controller out of detent or the FTR is active, a logic switch 1501 in FIG. 14 will set the back drive signal that is sent to the trim actuator to zero. In this case, since the pilot's movement of the vertical controller is a VS command, the VFPC command output from the control laws will be the difference between the vertical controller position and the command needed to generate the commanded VS. With proper gearing of the VS command proportional to the vertical controller displacement, the VFPC command can be kept at a minimum. This will give the pilot accurate tactile feedback on power state during movement of the collective to change VS.

The intuitive nature of the VFPC design will enable the pilot to precisely control vertical flight path throughout the aircraft envelope with minimal workload. The VFPC design will hold either altitude or VFPA in the absence of pilot vertical controller inputs. The vertical controller will be back driven to give the pilot feedback on the power state of the aircraft. The pilot can make small adjustments to the vertical flight path by using a vertical beep switch. For larger adjustments, the pilot can simply move the vertical controller to reset the vertical state. Once the pilot stops the vertical control inputs, the control laws will capture and hold the new vertical state.

This invention overcomes the shortcomings of the other methods currently used for VFPC. Since the VFPC command is transmitted directly to the vertical control surface actuator or actuators, the system has the speed to precisely hold or change vertical flight path even during aggressive GRM. By back driving the pilot's vertical controller while vertical hold modes are engaged, the pilot will have tactile feedback on the power state of the aircraft. Additionally, the automatic features of VFPC allow the pilot to make larger adjustments to vertical flight path without ever having to activate any switches.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A flight control system for vertical flight path control of an aircraft having a sensor, the system comprising:
    a flight control computer having an algorithm, the algorithm having a stable decoupled model having a decoupled lateral equation of aircraft motion and a decoupled longitudinal equation of aircraft motion; and
    a feedback command loop operably associated with the stable decoupled model, the feedback command loop having:
        a vertical flight path angle control law configured to receive data from the sensor and a vertical command from a controller;
        an altitude control law configured to receive data from the sensor; and
        a vertical speed control law configured to receive data from the sensor and configured to send a command to the actuator;
    a switch in communication with both the vertical flight path angle control law and the altitude control law, the switch being configured to send data to the vertical speed control law;
    wherein the vertical flight path angle control law, the altitude control law, and the vertical speed control law utilize the lateral equation of aircraft motion and the longitudinal equation of aircraft motion; and
    wherein the vertical speed control law is operably associated with the altitude control law when an aircraft altitude hold device is activated.

2. The flight control system of claim 1, wherein the controller is selected from the group consisting of a cockpit vertical controller, a vertical beep switch, and a vertical controller force trim release switch.

3. The flight control system of claim 1, wherein in the absence of the vertical command from the controller, the feedback command loop will automatically engage altitude hold when an absolute value of either vertical speed of the aircraft or the vertical flight path angle fall below a design threshold.

4. The flight control system of claim 1, wherein the feedback command loop uses a vertical controller force to determine when the controller is out of a no force detent position.

5. The flight control system of claim 4, wherein the feedback command loop calculates a vertical controller displacement when the controller is out of detent.

6. The flight control system of claim 1, further comprising:
    wherein the aircraft sensor is selected from the group consisting of an internal navigation system, an air data computer, and a radar altimeter.

7. The flight control system of claim 1, further comprising:
    a main rotor collective pitch actuator operably associated with the feedback command loop.

8. The flight control system of claim 1, wherein the feedback command loop further comprises:
- a speed hysteresis control loop for preventing rapid switching between a low speed control law and a high speed control law when operating in a transition zone;
- wherein during acceleration of the aircraft, the feedback command loop switches to a high speed vertical flight path control envelope when passing an upper limit of the transition zone; and
- wherein during deceleration of the aircraft, the feedback command loop switches to a low speed vertical flight path control envelope when passing a lower limit of the transition zone.

9. The flight control system of claim 1, wherein the vertical flight path angle control law is computed with the following equation:

$$\gamma = \tan^{-1}\left(\frac{V_z}{V_x}\right);$$

wherein $\gamma$ is the vertical flight path angle, $V_z$ is the vertical speed, and $V_x$ is the forward groundspeed relative to the aircraft.

10. The flight control system of claim 1, further comprising:
- a pitch attitude control loop for predicting the change in vertical speed caused by a pitch attitude change, the pitch attitude control loop being computed with the following equation:

$$V_{z\Delta\theta} = V_x \cdot \tan \Delta\theta;$$

wherein $V_{z\Delta\theta}$ is the pitch vertical speed change and $\Delta\theta$ is the change in pitch attitude, and $V_x$ is the forward groundspeed relative to the aircraft.

11. The flight control system of claim 10, wherein $\Delta\theta$ is calculated using a washout filter.

12. The flight control system of claim 1, wherein the vertical flight path angle control law utilizes the following equation to compute the vertical speed needed to hold a reference vertical flight path angle:

$$V_{z\,REF} = V_x \cdot \tan \gamma_{REF}$$

wherein $V_{z\,REF}$ is a reference vertical speed and $\gamma_{REF}$ is the reference vertical flight path angle.

13. The flight control system of claim 1, further comprising:
- a logic switch;
- wherein the logic switch is adapted to allow the feedback command loop to back drive a vertical controller trim actuator.

14. The flight control system of claim 1, wherein a command from the feedback command loop is added to a vertical controller position for operating a vertical control surface actuator.

15. A method for vertical flight path control of an aircraft, comprising:
- providing a flight control computer having an algorithm, the algorithm being configured to decouple a model having a lateral equation of aircraft motion and a longitudinal equation of aircraft motion;
- stabilizing the aircraft by individually analyzing the lateral equation of motion and the longitudinal equation of motion; and
- controlling the vertical flight path of the aircraft with a feedback command loop associated with the algorithm, the feedback command loop, having:
  - a vertical flight path angle control law configured to receive data from the sensor and a vertical command from a controller;
  - an altitude control law configured to receive data from the sensor; and
  - a vertical speed control law configured to receive data from the sensor and configured to send a command to the actuator;
- communicating both the vertical flight path angle control law and the altitude control law with a switch, the switch being configured to send data to the vertical speed control law;
- wherein the vertical flight path angle control law, the altitude control law, and the vertical speed control law utilize the lateral equation of aircraft motion and the longitudinal equation of aircraft motion; and
- wherein the vertical speed control law is operably associated with the altitude control law when an aircraft altitude hold device is activated.

16. The method of claim 15, further comprising:
- calculating the vertical flight path angle control law with the following equation:

$$\gamma = \tan^{-1}\left(\frac{V_z}{V_x}\right);$$

wherein $\gamma$ is the vertical flight path angle, $V_z$ is the vertical speed with up positive, and $V_x$ is the forward groundspeed relative to the aircraft.

17. The method of claim 15, further comprising:
- predicting the change in vertical speed caused by a pitch attitude change with a pitch attitude control loop with the following equation:

$$V_{z\Delta\theta} = V_x \cdot \tan \Delta\theta;$$

wherein $V_{z\Delta\theta}$ is the pitch vertical speed change and $\Delta\theta$ is the change in pitch attitude, and $V_x$ is the forward groundspeed relative to the aircraft.

* * * * *